US009151212B2

(12) United States Patent
Dumser et al.

(10) Patent No.: US 9,151,212 B2
(45) Date of Patent: Oct. 6, 2015

(54) PRECHAMBER SYSTEM FOR AN INTERNAL COMBUSTION ENGINE

(71) Applicant: GE Jenbacher GmbH & Co OG, Jenbach (AT)

(72) Inventors: Frederic Dumser, Innsbruck (AT); Florian Becker, Maurach a.A. (AT)

(73) Assignee: GE Jenbacher GMBH & Co OG, Jenbach (AT)

( * ) Notice: Subject to any disclaimer, the term of this patent is extended or adjusted under 35 U.S.C. 154(b) by 0 days.

(21) Appl. No.: 14/284,714

(22) Filed: May 22, 2014

(65) Prior Publication Data

US 2014/0251259 A1 Sep. 11, 2014

Related U.S. Application Data

(63) Continuation of application No. PCT/AT2012/000177, filed on Jun. 29, 2012.

(30) Foreign Application Priority Data

Dec. 28, 2011 (AT) .................................. 1898/2011

(51) Int. Cl.
*F02B 19/08* (2006.01)
*F02B 19/12* (2006.01)
(Continued)

(52) U.S. Cl.
CPC ................. *F02B 19/12* (2013.01); *F02B 19/08* (2013.01); *F02B 19/1014* (2013.01); *F02B 19/1071* (2013.01); *F02B 19/18* (2013.01);
(Continued)

(58) Field of Classification Search
CPC .... F02B 19/08; F02B 19/1014; F02B 19/108; F02B 19/1085; F02B 19/12
USPC .......... 123/260, 261, 263, 266–268, 275, 280
See application file for complete search history.

(56) References Cited

U.S. PATENT DOCUMENTS 3,926,158 A * 12/1975 Dolza, Sr. ...................... 123/274
4,046,111 A * 9/1977 Nagano .......................... 123/260
(Continued)

FOREIGN PATENT DOCUMENTS

GB 1 535 762 12/1978
JP 2567875 4/1998
WO 2009/109694 9/2009

OTHER PUBLICATIONS

International Search Report issued Oct. 12, 2012 in International (PCT) Application No. PCT/AT2012/000177.
(Continued)

*Primary Examiner* — Erick Solis
(74) *Attorney, Agent, or Firm* — Wenderoth, Lind & Ponack, L.L.P.

(57) ABSTRACT

A pre-chamber system for an internal combustion engine has a pre-chamber having a wall, a spark plug having at least one electrode, and a gas introduction device, particularly a gas valve. A gas channel connects the gas introduction device to the pre-chamber via an inlet opening. A riser channel connects the pre-chamber (2) to a combustion chamber of the internal combustion engine. A guiding device influences the flow of the gas in the pre-chamber, the guiding device being arranged adjacent to the inlet opening in such a manner that in operation, the volume flow of hot gas flowing into the pre-chamber via the channel (8) and reaching the electrode (13) of the spark plug (4) is reduced by the guiding device (9).

16 Claims, 4 Drawing Sheets

(51) Int. Cl.
  *F02B 19/10* (2006.01)
  *F02B 19/18* (2006.01)
  *F02M 21/02* (2006.01)

(52) U.S. Cl.
  CPC ........... *F02M21/0281* (2013.01); *Y02T 10/125* (2013.01); *Y02T 10/32* (2013.01)

(56) References Cited

U.S. PATENT DOCUMENTS

| | | |
|---|---|---|
| 4,091,772 A | 5/1978 | Heater et al. |
| 4,095,565 A | 6/1978 | Noguchi et al. |
| 4,149,495 A | 4/1979 | Miura |
| 4,218,993 A | 8/1980 | Blackburn |
| 4,323,039 A * | 4/1982 | Tsugekawa et al. .......... 123/275 |
| 4,467,759 A | 8/1984 | Artman |
| 4,612,888 A * | 9/1986 | Ishida et al. .................. 123/261 |
| 4,646,695 A * | 3/1987 | Blackburn .................... 123/256 |
| 4,903,656 A | 2/1990 | Nakazono et al. |
| 5,222,993 A | 6/1993 | Crane |
| 5,947,076 A | 9/1999 | Srinivasan et al. |

OTHER PUBLICATIONS

Austrian Search Report issued May 23, 2012 in corresponding Austrian Patent Application No. A 1898/2011 with English translation.
European Search Report dated Jun. 11, 2015, in European Application No. 15 00 0442.

* cited by examiner

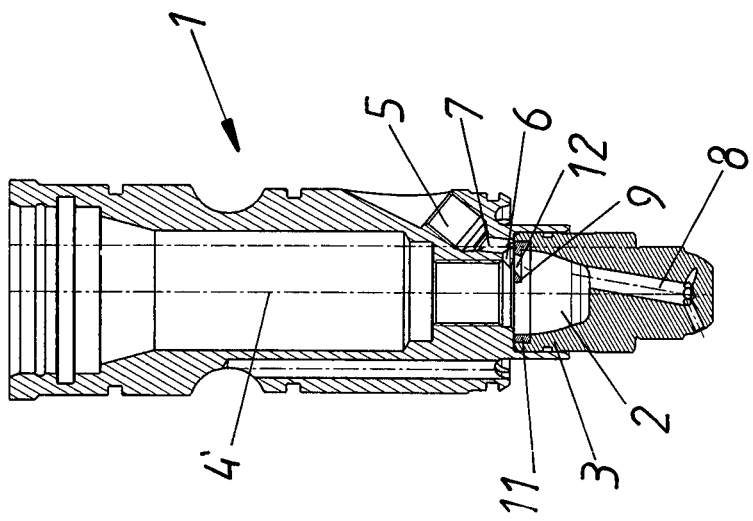
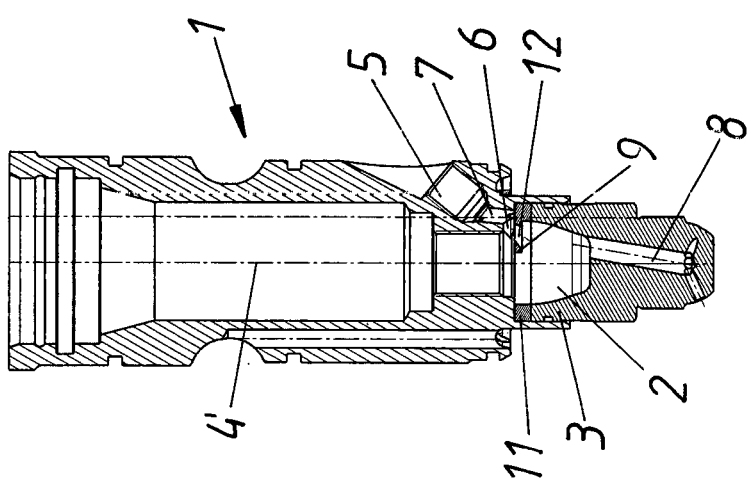
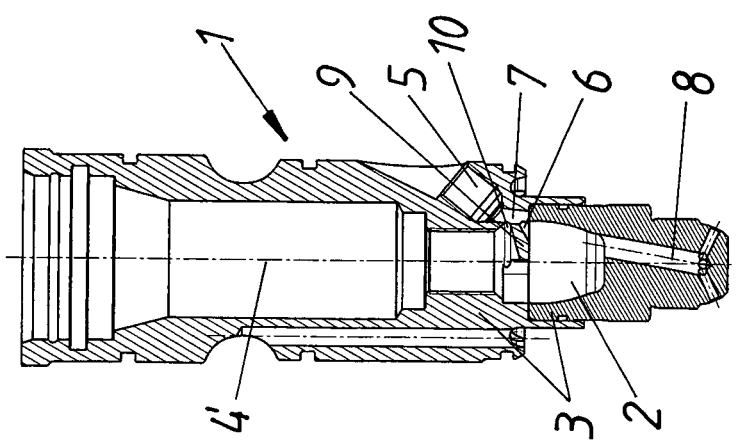

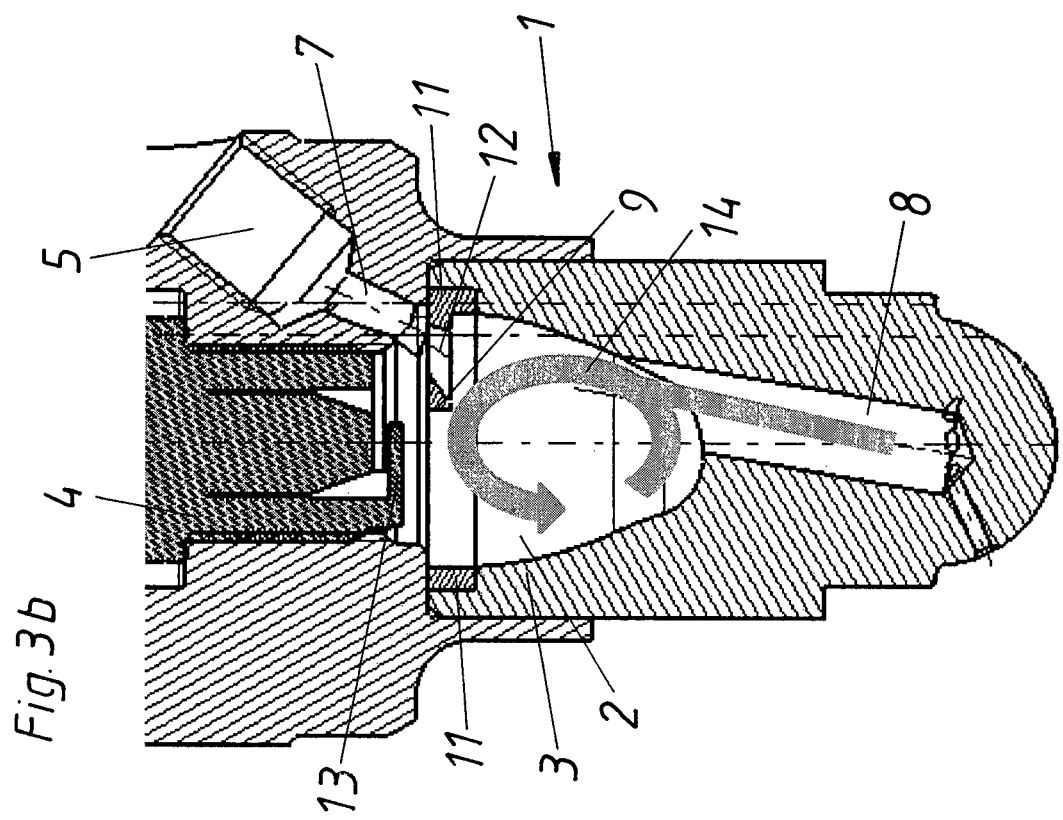
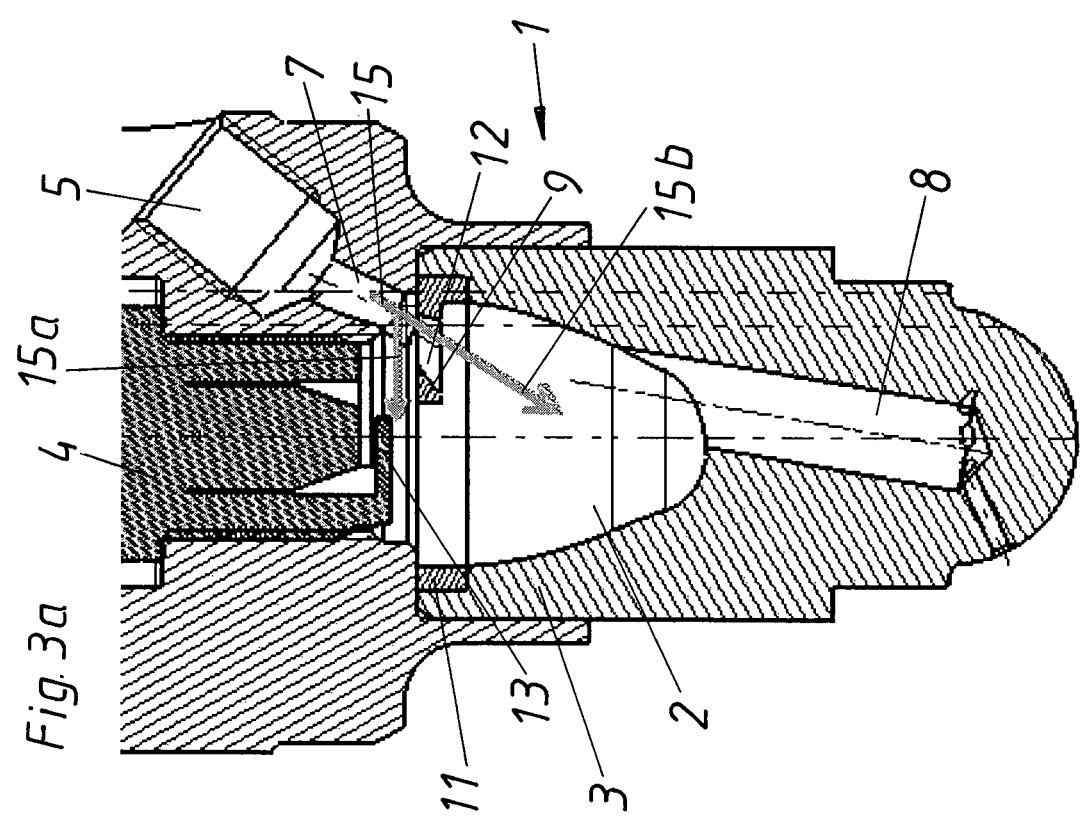

PRECHAMBER SYSTEM FOR AN INTERNAL COMBUSTION ENGINE

BACKGROUND OF THE INVENTION

The present invention concerns a prechamber system for an internal combustion engine and an internal combustion engine, in particular a gas Otto-cycle engine, having such a prechamber system.

Internal combustion engines from a given structural size involve the use of gas-scavenged prechamber systems, the purpose of which is to cause ignition in a combustion chamber of the internal combustion engine in such a way that ideal combustion is achieved. In that case a given amount of gas is fed to the prechamber during the induction stroke of the internal combustion engine by way of a gas introduction device.

At the same time an overstoichiometric gas-air mixture is fed to the combustion chamber. During the compression stroke the overstoichiometric mixture flows into the prechamber by way of a communicating transfer opening (riser passage) and there mixes with the pure gas to give an approximately stoichiometric mixture ($\lambda=1$).

After mixing of the gas-air mixture with pure gas, however, local regions still remain in which the pure gas has mixed only very slightly with the overstoichiometric gas-air mixture. The partially homogenized mixture is ignited by way of a spark plug. By virtue of an increase in pressure the burnt hot gas flows by way of the communicating transfer opening (riser passage) into the combustion chamber of the internal combustion engine and causes ignition therein.

A disadvantage with such systems is, on the one hand, a tendency for soot to be produced in the so-called dead volumes, that is to say those volumes in which mixing occurs only inadequately, and on the other hand, a severe thermal loading on the electrodes of the spark plug by virtue of hot combustion gases.

Prechamber systems with guide devices are known from the state of the art and serve differing purposes (see for example U.S. Pat. No. 4,467,759 or U.S. Pat. No. 4,095,565).

SUMMARY OF THE INVENTION

The object of the invention is to prolong the service life of the spark plug in prechamber systems and internal combustion engines of the general kind set forth.

That object is attained by a prechamber system for an internal combustion engine having a prechamber having a wall, a spark plug having at least one electrode, a gas introduction device including a gas valve, a gas passage connecting the gas introduction device to the prechamber by way of an inlet opening, a riser passage for connecting the prechamber to a combustion chamber of the internal combustion engine, and a guide device for influencing the flow of the gas and the prechamber, so that the guide device is arranged adjacent to the inlet opening in such a way that in operation, the volume of flow of hot gas reaching the electrode of the spark plug, which hot gas flows into the prechamber by way of the riser passage, is reduced in comparison to the volume of flow of hot gas and reach the electrode of the spark plug without the guide device, and an internal combustion engine having such a prechamber system.

Arranging the guide device in adjacent relationship to the inlet opening for the gaseous fuel in such a way that in operation a reduction in the volume flow of hot gases passing into the prechamber by way of the riser passage is effected by the guide device in the region of the electrode of the spark plug gives a prolongation in the service life of the spark plug, as in that way the input of heat to the electrode of the spark plug decreases and a cooler electrode results in a prolonged average spark plug service life.

If it is provided that, arranged between the spark plug and the guide device is a bore in the wall of the prechamber, by way of which that partial volume of the prechamber, that is, between the spark plug and the guide device, is in communication with the gas passage then cool fresh gas which is introduced into the gas passage by the gas introduction device and which passes by way of the bore into the partial volume can flow directly past the electrode of the spark plug, and that actively cools it. In addition increased soot formation is prevented.

If it is provided that the guide device is disposed between the inlet opening of the gas passage and the riser passage, it is then possible, even without a bore in the wall of the prechamber, to ensure that cool fresh gas flows out of the gas passage over the electrode of the spark plug. In that case, however, the guide device should have a through opening connecting the inlet opening of the gas passage and the riser passage. That ensures that fresh gas issuing from the gas passage can flow unimpededly into the prechamber. By virtue of orienting the through opening towards the gas passage it is possible to promote an inlet flow of the lean gas-air mixture into the dead volume in front of and in the gas passage during the compression phase prior to combustion, and that leads to better homogenization with fresh gas and thus reduces soot formation in the dead volume.

In principle it can be provided that the guide device is integral with the wall of the prechamber.

It can however also be provided that the guide device is fixed to the wall of the prechamber. For that purpose the guide device can have an annular portion, by way of which it is fixed to the wall of the prechamber, for example being pressed or laid therein.

The internal combustion engine according to the invention is in particular a stationary internal combustion engine, preferably an—in particular stationary—gas Otto-cycle engine.

BRIEF DESCRIPTION OF THE DRAWINGS

Further advantages and details of the invention will be apparent from the Figures and the related specific description. In the drawings:

FIGS. 2a through 2c show three embodiments of the invention, wherein the variant in FIG. 2a corresponds to that in FIG. 1, FIGS. 3a and 3b show views of the flow conditions in a prechamber system according to the invention by reference to the embodiment of FIG. 2c.

DETAILED DESCRIPTION OF THE PREFERRED EMBODIMENTS

Figure 1:
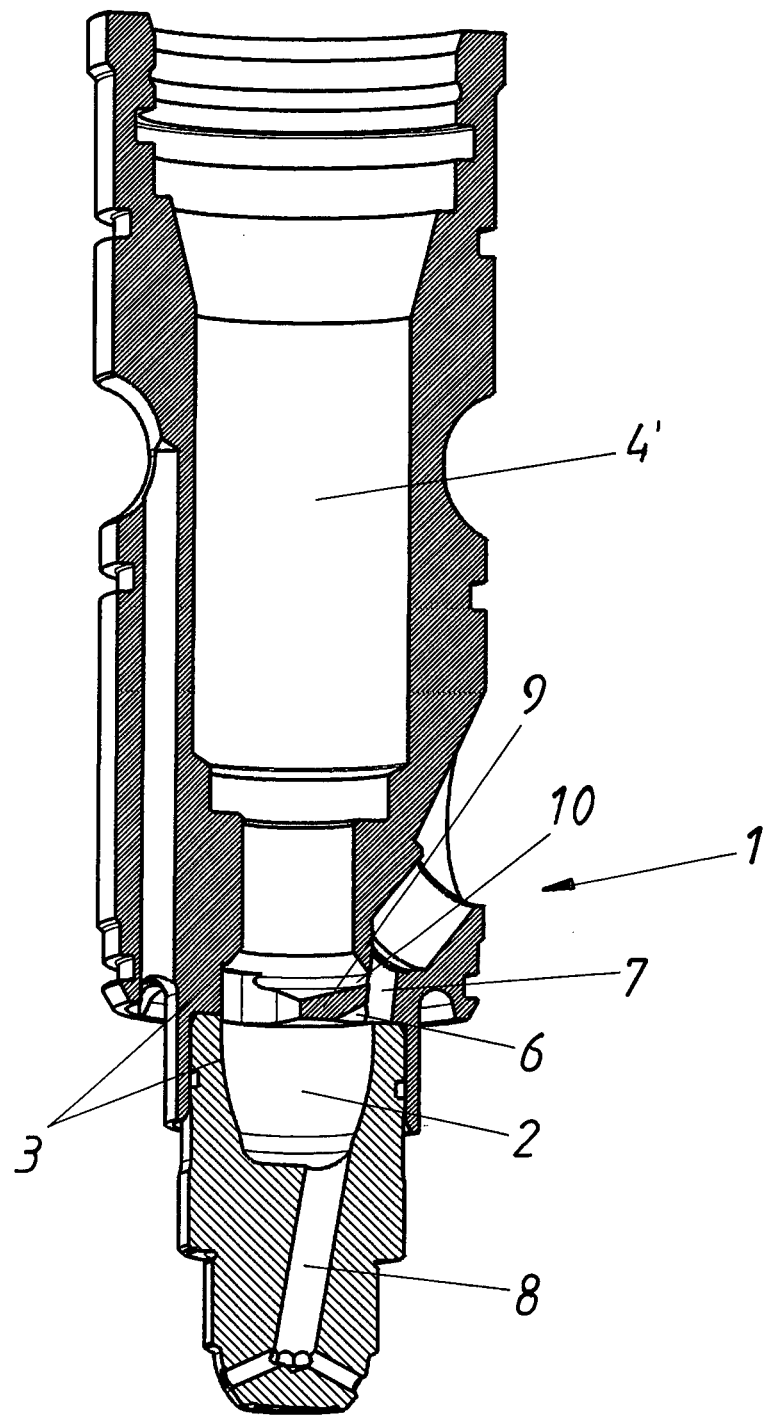
FIG. 1 shows a perspective sectional view through a prechamber system according to the invention.

FIG. 1 shows a first embodiment of a prechamber system 1 according to the invention. In this case the prechamber 2 is formed by a wall 3 and can be connected by way of a riser passage 8 to a combustion chamber (not shown) of an internal combustion engine, or in the assembled condition is connected thereto. The riser passage 8 opens asymmetrically into the prechamber 2, thereby ensuring that a so-called tumble flow 14 is produced (see FIG. 3b).

A spark plug 4 (not shown in FIG. 1 but see FIGS. 3a and 3b) can be fitted into the prechamber system 1 in a shaft 4'. A gas passage 7 connects an introduction device 5 (not shown in FIG. 1 but see FIG. 2a) to the prechamber 2 by way of an inlet opening 6. A guide device 9 is arranged in the prechamber system 1 in adjacent relationship with the inlet opening 6. Arranged above the guide device 9 in the wall 3 of the prechamber 2 is a bore 10, which forms a communication with the gas passage 7.

The bore 10 ensures that fresh gas can pass from the gas passage 7 into the region above the guide device 9 and passes through the guide device 9 to the electrode 13 (not shown in FIG. 1 but see FIGS. 3a and 3b) of the spark plug 4 to actively cool it.

FIG. 2a shows once again the prechamber system 1 of FIG. 1, but in this case it is possible to see the gas introduction device 5 in the form of a gas valve.

In the variant in FIG. 2b the guide device 9 is not integral with the wall 3 of the prechamber 2, as is the case in FIGS. 1 and 2a. In this embodiment (and also in the embodiment in FIG. 2c) the guide device 9 is fixed to the wall 3 of the prechamber 2. For that purpose the guide device 9 has an annular portion 11, by way of which it is clamped to the wall 3 of the prechamber (FIG. 2b variant) or pressed therein (FIG. 2c variant).

A further difference between the variants in FIGS. 2b and 2c and that in FIGS. 1 and 2a is that in the variants in FIGS. 2b and 2c the guide device 9 is arranged between the inlet opening 6 of the gas passage 7 and the riser passage 8. The additional bore 10 shown in FIGS. 1 and 2a can thus be omitted. In order to ensure however that sufficient fresh gas can flow into the prechamber 2 the guide device 9 is provided with a through opening 12. The resulting flow conditions in relation to the fresh gas are shown in FIG. 3a, in respect of the FIG. 2c variant. The flow 12 of fresh gas introduced into the gas passage 7 by way of the gas introduction device 5 presents itself as a partial flow 15a which flows over the electrode 13 of the spark plug 4 and a partial flow 15b which flows into the prechamber 2 through the through opening 12.

It is to be noted that the scavenging phase is shown in FIG. 3a while FIG. 3b shows the compression phase (compression stroke) of the internal combustion engine.

Figure 4:
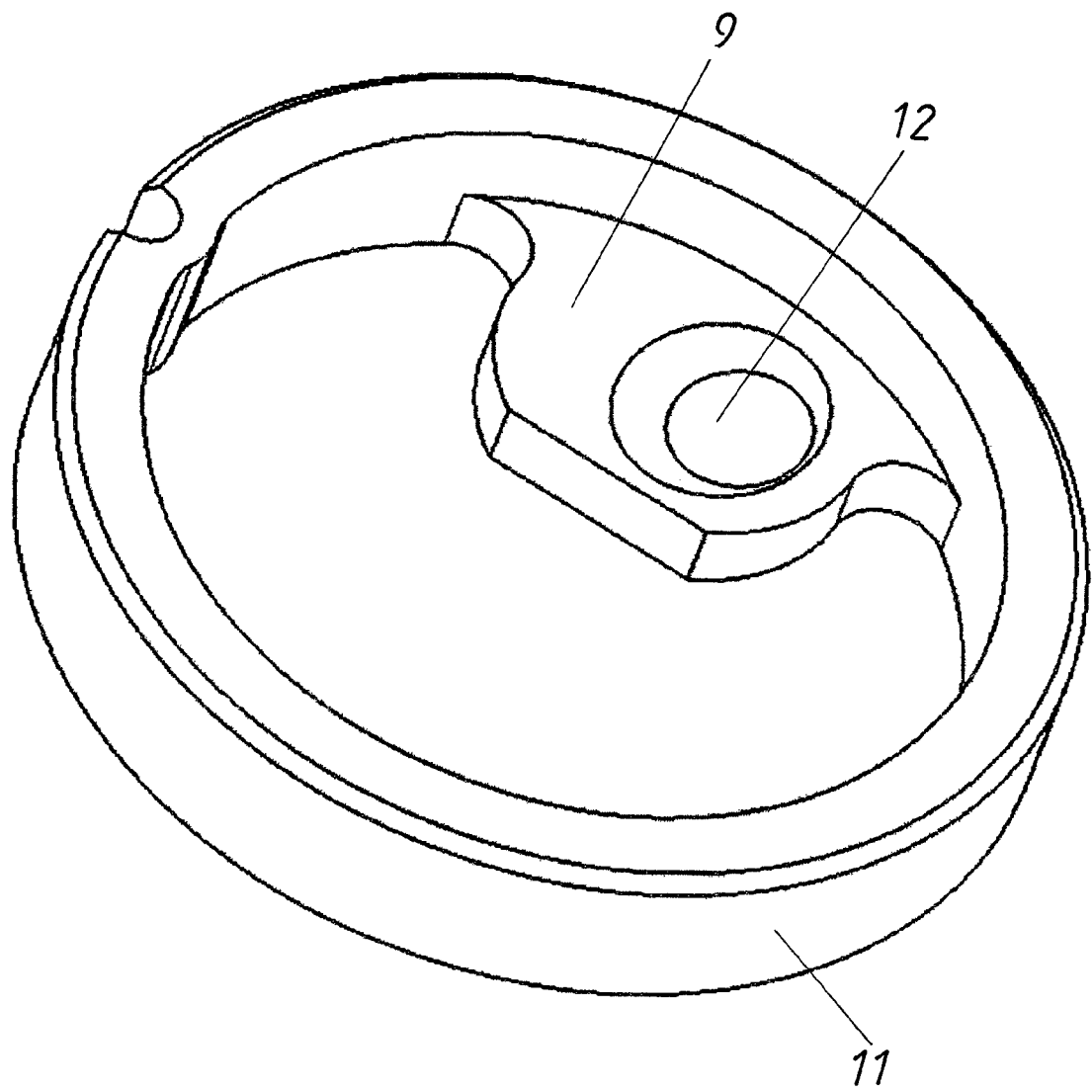
FIG. 4 shows a perspective view of a detail of FIG. 2b.

FIG. 4 shows a perspective view of the annular portion 11 with guide device 9 for those embodiments where the guide device 9 is fixed to the wall 3 of the prechamber 2 and is not integral with the prechamber 2.

The invention claimed is:

1. A prechamber system for an internal combustion engine, comprising:
   a prechamber having a wall,
   a spark plug having at least one electrode,
   a gas introduction device including a gas valve,
   a gas passage connecting the gas introduction device to the prechamber by way of an inlet opening,
   a riser passage for connecting the prechamber to a combustion chamber of the internal combustion engine, and
   a guide device for influencing the flow of the gas in the prechamber,
   wherein the guide device is arranged adjacent to the inlet opening in such a way that in operation, the volume of flow of hot gas reaching the electrode of the spark plug, which hot gas flows into the prechamber by way of the riser passage, is reduced in comparison to the volume of flow of hot gas that would reach the electrode of the spark plug with out the guide device, and
   wherein the guide device extends into the prechamber between the inlet opening of the gas passage and the spark plug.

2. The prechamber system of claim 1, wherein a bore is arranged in the wall of the prechamber between the spark plug and the guide device so as to communicate a partial volume of the prechamber that is between the spark plug and the guide device with the gas passage.

3. The prechamber system of claim 1, wherein the guide device is in the form of a projection that projects into the prechamber at approximately at a right angle to the axis of the prechamber.

4. The prechamber system of claim 1, wherein the guide device is provided integrally with the wall of the prechamber.

5. The prechamber system of claim 1, wherein the guide device is fixed to the wall of the prechamber.

6. The prechamber system of claim 5, wherein the guide device has an annular portion by way of which the guide device is fixed to the wall of the prechamber.

7. The prechamber system of claim 6, wherein the guide device is fixed to the wall of the prechamber by being pressed in or laid therein.

8. The prechamber system of claim 1, wherein the guide device extends into the prechamber at the height of the gas passage in the prechamber.

9. An internal combustion engine having the prechamber system of claim 1, wherein the riser passage is connected to a combustion chamber of the internal combustion engine.

10. A prechamber system for an internal combustion engine, comprising:
    a prechamber having a wall,
    a spark plug having at least one electrode,
    a gas introduction device including a gas valve,
    a gas passage connecting the gas introduction device to the prechamber by way of an inlet opening,
    a riser passage for connecting the prechamber to a combustion chamber of the internal combustion engine, and
    a guide device for influencing the flow of the gas in the prechamber,
    wherein the guide device is arranged adjacent to the inlet opening in such a way that in operation, the volume of flow of hot gas reaching the electrode of the spark plug, which hot gas flows into the prechamber by way of the riser passage, is reduced in comparison to the volume of flow of hot gas that would reach the electrode of the spark plug with out the guide device, and
    wherein the guide device is disposed between the inlet opening of the gas passage and the riser passage, the guide device having a through opening connecting the inlet opening and the riser passage.

11. The prechamber system of claim 10, wherein the guide device is in the form of a projection that projects into the prechamber at approximately at a right angle to the axis of the prechamber.

12. The prechamber system of claim 10, wherein the guide device is provided integrally with the wall of the prechamber.

13. The prechamber system of claim 10, wherein the guide device is fixed to the wall of the prechamber.

14. The prechamber system of claim 13, wherein the guide device has an annular portion by way of which the guide device is fixed to the wall of the prechamber.

15. The prechamber system of claim 14, wherein the guide device is fixed to the wall of the prechamber by being pressed in or laid therein.

16. An internal combustion engine having the prechamber system of claim 10, wherein the riser passage is connected to a combustion chamber of the internal combustion engine.

\* \* \* \* \*